Oct. 7, 1952     H. A. HEDLAND     2,612,716

FISHING LURE

Filed Feb. 23, 1950

Inventor
Harry A Hedland.
by Roland C Lehn
Attorney.

Patented Oct. 7, 1952

2,612,716

UNITED STATES PATENT OFFICE 2,612,716

FISHING LURE

Harry A. Hedland, Evanston, Ill.

Application February 23, 1950, Serial No. 145,778

3 Claims. (Cl. 43—42.09)

This invention relates to fishing lures.

Fishing lures embodying the invention are characterized by removable and interchangeable bodies of various colors and shapes. With a supply of bodies of various shapes and colors, a fisherman is thus provided with a lure which can be given a shape and/or color to suit varying conditions and the preferences of the fisherman.

The nature of the invention may be readily understood by reference to an illustrative lure embodying the invention and shown in the accompanying drawing.

Figure 1:
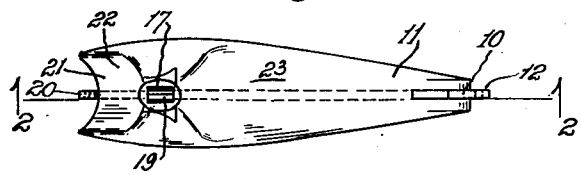
Fig. 1 is a plan view of an illustrative lure.
Figure 2:
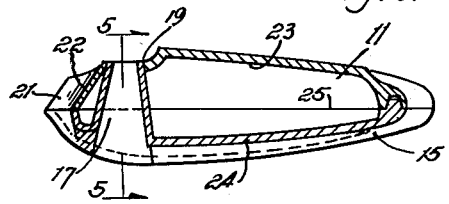
Fig. 2 is a vertical longitudinal section of the lure body taken on the plane 2—2 of Fig. 1.
Figure 5:
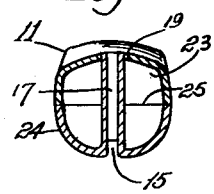
Fig. 5 is a transverse section of the lure taken on the plane 5—5 of Fig. 2.
Figure 3:
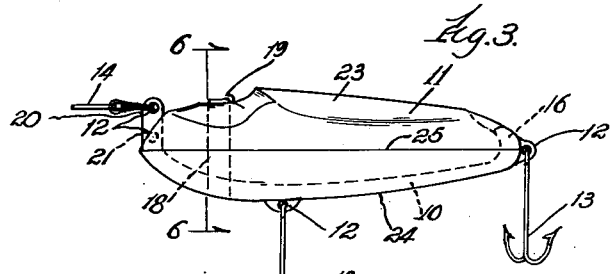
Fig. 3 is a side elevation of the lure.
Figure 4:
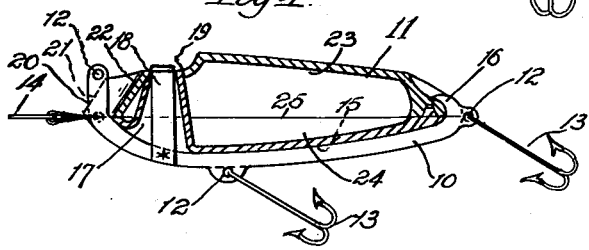
Fig. 4 is a longitudinal section similar to that of Fig. 2, of the complete lure.
Figure 6:
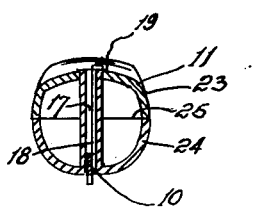
Fig. 6 is a section taken on the plane 6—6 of Fig. 3 illustrating a releasable catch for holding the lure body and hook carrier in assembled relation.

The invention is here shown embodied in a "casting plug" or artificial lure. Such lures may be designed either to travel below the surface or to skip along the surface. The illustrative lure comprises a hook carrier 10 and an enveloping, removable body 11 which determines the shape and color of the lure. The hook carrier 10, which is common to various shapes and colors of bodies, is in this instance in the form of a relatively thin elongated metal blade adapted to extend longitudinally of the lure body and advantageously made of corrosion resistant metal such as brass, stainless steel and the like. The hook carrier is provided with eyes 12 or other means for attachment of one or more hooks 13 and a line or leader 14. The body 11 is provided with a longitudinal groove or slot 15, in this instance extending along the under side of the body, for receiving the hook carrier. In one end of the body, in this instance the rear end, the slot is extended around the end to give it a hook or re-entrant shape for receiving the hooked extremity 16 of the hook carrier (Figs. 2, 3 and 4). The body is provided with a further recess 17 longitudinally spaced from hook 16 (Figs. 2, 4, 5 and 6) for receiving a releasable latch 18 on the hook carrier which is adapted to latch over a portion of the body of the lure (as at 19) for locking the hook carrier in place in the body. Thus, the latch 18 and the hooked extremity 16 on the carrier, securely fasten the body of the lure to the carrier. Removal of the body from the carrier is effected simply by deflecting the catch laterally until it clears the surface 19 thereof to permit it to be drawn through the recess 17 of the body, thereby releasing the latter. Obviously the form which the latch takes, its position and method of latching to the body, may be considerably varied. That here shown is illustrative only. In this case slot 15 is continued to the forward end of the body to receive the front end 20 of the hook carrier (Fig. 4).

The dimensions and shape of the slot 15 in the body and the recesses and surfaces for receiving the hooked extremity and latch 18 are uniform for all types of bodies, but the external shape and size of the latter are independent of the aforesaid dimensions, and may therefore have great variety. Preferably the fisherman carries a supply of different bodies designed to give varying effects, each of which is adapted to be attached to the common hook carrier.

The nose 21 of the body also may be designed with various shaped and inclined surfaces to create a tendency for the lure to ride below the surface or to skip along the surface or to oscillate from side to side. As here shown, the nose of the body is given a downwardly and forwardly inclined surface 22 to cause the lure to tend to ride below the surface. In this case the surface 22 is also transversely concave. The shape and contour of the nose also being completely independent of the hook carrier, may be given any desired conformation.

In the illustrative lure the leading end of the hook carrier extends upwardly and is provided with a plurality of leader attaching eyes at different levels to shift the line of pull relative to the axis of the lure. Depending on the point of attachment of the leader, the lure is caused to tend to travel along the surface of the water or below the surface.

Preferably the portions of the hook carrier provided with the hook and leader eyes 12 project from the body to give freedom of movement both to the hook and leader (Figs. 3 and 4). The balance of the carrier may advantageously be seated in and concealed in the longitudinal recess 15. Hooks of various types, single, multiple, weedless, etc. may be attached to the carrier, as desired.

The body of the lure is advantageously made hollow (Figs. 2 and 4) to facilitate limitation of the weight of the lure to what is desired for casting or trolling. This may advantageously be effected by molding the lure in halves, in this instance upper half 23 and lower half 24, which are joined along the dividing line 25 to seal the interior. The lure body may advantageously be made of some suitable plastics material and the halves may be tightly joined together by appropriate plastic cements or by the use of a solvent, e. g. acetone, which softens the meeting edges of the halves so that they may be pressed and welded together. When the solvent evaporates the plastic again hardens. One suitable plastic for this purpose is cellulose acetate butyrate, but many other well known plastic materials including but not limited to acrylic, vinyl, phenol and urea-formaldehyde resins, are suitable.

The hollow lure advantageously floats, and if it should accidentally be detached from the carrier will float on the surface and be recovered. The bodies are smooth in contour and being without hooks can conveniently be carried in a pocket without the necessity for special care heretofore necessary for lures with hooks. A body may be changed without detaching the lure from the line simply by releasing catch 18 and withdrawing the body from the carrier. The metal hook carrier along the lower portion of the lure lowers the center of gravity of the lure so that in the illustrative lure there is no tendency for the lure to spin or rotate about its longitudinal axis.

Obviously the invention is not limited to the details of the illustrative embodiments, since these may be variously modified. Moreover, it is not indispensable that all features of the invention be used conjointly, since various features may be used to advantage in different combinations and subcombinations.

Having described my invention, I claim:

1. A fishing lure comprising in combination an elongated lure body, said body having on its underside a groove extending from a point adjacent the front end of said body to the rear end thereof and around said end sufficiently to give the groove a hook-shaped contour, said body also having at said point an internal passage extending upwardly from said groove through the top of said body, an elongated hook carrier having a cross section corresponding to the cross section of said groove and a hook-shaped contour corresponding to that of said groove to adapt the carrier to hook around the rear end of said body and to lie substantially entirely in said groove and substantially flush with the outer surface of said body, said carrier having a resilient latch extending upwardly therefrom and adapted to extend through said passage when the carrier is seated in said groove and resiliently to engage the top surface of said body to hold the carrier against displacement from said groove, and said carrier having depending hook attaching means and a line attaching means at its forward end, said carrier with hooks and line being completely detachable from said body on deflection of said latch from engagement with said body to permit another body having a similarly shaped groove and passage to be attached to said carrier, said body having less bulk density than water to cause the same to float if detached from said carrier.

2. A fishing lure comprising in combination a lure body which gives to the lure its external shape, size and color, an elongated metal hook carrier having means for attaching a line and hooks thereto, said body having on its lower side a longitudinally extending groove for receiving and enclosing said carrier, said groove having a portion extending around the end and partly on to the top of said body to give the groove a hook-shaped contour, said carrier having a correspondingly hook-shaped portion adapted to lie in said hook-shaped contour and fit over said end of the body, said carrier having adjacent its other end a latch, and said body having therein a hollow recess to receive and be engaged by said latch, said carrier with line and hooks being wholly detachable from said body on deflection of said latch and unhooking of said carrier from the hook-shaped portion of said groove, the exterior portions of the body determining the shape and size thereof being independent of said carrier.

3. A fishing lure comprising in combination a lure body which gives to the lure its external shape, size and color, a detachable elongated hook carrier in the form of a narrow and thin metal strip having means for attaching a line and hooks thereto, said body having a narrow thin groove therein corresponding in cross section to the cross-section of said carrier and extending longitudinally of said body and around one end so as to provide a hook-shaped contour at said end, one end of said carrier having a hook-shaped portion corresponding in contour to the hook-shaped portion of said groove, said carrier being adapted to lie in said groove with its outer surface substantially flush with the surface of said body, a releasable catch adjacent the front end of said carrier, and said body having an internal hollow passage to receive the catch and a surface to be engaged by said catch to lock said carrier in said groove.

HARRY A. HEDLAND.

REFERENCES CITED

The following references are of record in the file of this patent:

UNITED STATES PATENTS

| Number | Name | Date |
|---|---|---|
| 2,147,444 | Kelly | Feb. 14, 1939 |
| 2,295,292 | Rogers | Sept. 8, 1942 |
| 2,482,466 | Cooper | Sept. 20, 1949 |

FOREIGN PATENTS

| Number | Country | Date |
|---|---|---|
| 70,941 | Norway | Sept. 2, 1946 |